United States Patent
Yamada

(10) Patent No.: US 10,945,321 B2
(45) Date of Patent: Mar. 9, 2021

(54) LIGHT SOURCE APPARATUS AND PROJECTION-TYPE DISPLAY APPARATUS

(71) Applicant: SEIKO EPSON CORPORATION, Tokyo (JP)

(72) Inventor: Atsushi Yamada, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 40 days.

(21) Appl. No.: 16/254,973

(22) Filed: Jan. 23, 2019

(65) Prior Publication Data

US 2019/0230764 A1    Jul. 25, 2019

(30) Foreign Application Priority Data

Jan. 24, 2018  (JP) .............................. JP2018-009439

(51) Int. Cl.
*H05B 45/50*    (2020.01)
*G03B 21/20*    (2006.01)
(Continued)

(52) U.S. Cl.
CPC ......... *H05B 45/50* (2020.01); *G03B 21/2013* (2013.01); *G03B 21/2033* (2013.01);
(Continued)

(58) Field of Classification Search
CPC ............ H05B 33/0815; H05B 33/0845; H05B 33/083; H05B 37/0272; H05B 37/0227; H05B 45/10; H05B 45/14; H05B 45/345; H05B 45/50; H05B 47/10; H05B 47/23; H05B 47/24; H05B 47/25; G03B 21/2013; G03B 21/2033
See application file for complete search history.

(56) References Cited

U.S. PATENT DOCUMENTS

| 7,643,322 | B1 * | 1/2010 | Varga | .................... H02M 3/156 363/97 |
| 2004/0080273 | A1 * | 4/2004 | Ito | .......................... H05B 47/24 315/77 |

(Continued)

FOREIGN PATENT DOCUMENTS

JP    2016-105391 A    6/2016

*Primary Examiner* — Amy Cohen Johnson
*Assistant Examiner* — Syed M Kaiser
(74) *Attorney, Agent, or Firm* — Oliff PLC

(57) ABSTRACT

Provided is a light source apparatus including semiconductor light sources and a current detection resistor connected in series, a power source circuit that allows current to flow thereto, a current detection circuit that detects current flowing to the current detection resistor and outputs a current detection signal, a control circuit that controls the power source circuit such that a voltage of the current detection signal approaches a target value, a bypass circuit connected in parallel to the semiconductor light sources, and including a clamp element having a clamp voltage higher than a maximum voltage during operation of the semiconductor light sources and a bypass resistor connected in series to the clamp element, and allowing current to flow when an open fault occurs in the semiconductor light sources, and detection circuits that respectively detect an open fault in the semiconductor light sources based on an end-to-end voltage of the bypass resistors.

7 Claims, 2 Drawing Sheets

(51) Int. Cl.
*H05B 45/54* (2020.01)
*H05B 45/24* (2020.01)
*H05B 47/20* (2020.01)

(52) U.S. Cl.
CPC ............ *H05B 45/54* (2020.01); *H05B 45/24* (2020.01); *H05B 47/20* (2020.01)

(56) References Cited

U.S. PATENT DOCUMENTS

| | | | | |
|---|---|---|---|---|
| 2009/0237004 A1* | 9/2009 | Ploquin | ............... | H05B 45/48 315/294 |
| 2009/0256483 A1* | 10/2009 | Gehman | ............ | H05B 41/3924 315/129 |
| 2010/0060175 A1* | 3/2010 | Lethellier | .............. | H05B 45/37 315/164 |
| 2010/0308739 A1* | 12/2010 | Shteynberg | ............ | H05B 45/48 315/193 |
| 2011/0068702 A1* | 3/2011 | van de Ven | ............ | H05B 45/10 315/186 |
| 2012/0081009 A1* | 4/2012 | Shteynberg | ............ | H05B 45/46 315/122 |
| 2012/0187847 A1* | 7/2012 | Hamamoto | ............ | H05B 45/58 315/125 |
| 2012/0212143 A1* | 8/2012 | Esaki | .................... | H05B 45/50 315/192 |
| 2013/0038222 A1* | 2/2013 | Yeh | ........................ | H05B 45/44 315/152 |
| 2013/0249431 A1* | 9/2013 | Shteynberg | ............ | H05B 45/37 315/287 |
| 2014/0152180 A1* | 6/2014 | Wolf | ..................... | H05B 45/50 315/122 |
| 2014/0265885 A1* | 9/2014 | Hu | ........................ | H05B 45/48 315/186 |
| 2014/0367710 A1* | 12/2014 | Akiyama | ................ | H01L 23/24 257/88 |
| 2015/0208476 A1* | 7/2015 | Muramatsu | ............ | H05B 45/50 315/193 |
| 2015/0257225 A1* | 9/2015 | Yu | ........................ | H05B 45/48 315/122 |
| 2015/0326117 A1* | 11/2015 | Tischler | .................. | H02M 1/08 315/185 R |
| 2016/0081147 A1* | 3/2016 | Guang | .................. | H05B 45/50 315/123 |
| 2016/0143100 A1* | 5/2016 | Miyoshi | ............. | G03B 21/2033 315/120 |
| 2017/0034887 A1* | 2/2017 | Ichikawa | ................ | B60Q 1/04 |
| 2017/0189640 A1* | 7/2017 | Sadwick | ............... | H05B 47/155 |
| 2018/0168013 A1* | 6/2018 | Kikuchi | ............. | H05B 45/10 |
| 2018/0279429 A1* | 9/2018 | Sadwick | ............ | F21V 23/0471 |
| 2019/0021154 A1* | 1/2019 | Sadwick | ............... | H05B 45/37 |
| 2019/0098723 A1* | 3/2019 | Sadwick | ............ | H05B 33/0866 |

* cited by examiner

LIGHT SOURCE APPARATUS AND PROJECTION-TYPE DISPLAY APPARATUS

BACKGROUND

1. Technical Field

The present invention relates to a light source apparatus that uses a semiconductor light source such as a laser diode (LD) or a light emitting diode (LED). Furthermore, the invention relates to a projection-type display apparatus or the like that uses such a light source apparatus.

2. Related Art

For example, in a light source apparatus that uses a plurality of laser diodes, the laser diodes are connected in series and driven in order for the brightness of the laser diodes to be uniform and to simplify a drive circuit. However, in such a case, if there is an open fault in one of the laser diodes, current cannot flow to the other laser diodes.

In order to avoid such a situation, the laser diode with the open fault is bypassed and current is allowed to flow to the other laser diodes. As a related art, JP A-2016-105391 discloses a semiconductor light source drive apparatus that can continue to keep the remaining semiconductor light source elements on even if a disconnection fault occurs in some of the semiconductor light source elements, when a plurality of semiconductor light source elements are connected in series and driven.

This semiconductor light source drive apparatus includes, a light source unit that has a plurality of light source modules connected in series, each light source module having a switching element and an overdrive voltage detection circuit, in which a Zener diode and a light emitting element are connected in series, connected in parallel to at least one semiconductor light source light element, a direct current power source unit that supplies a direct current voltage to the light source unit, a switching element drive unit that drives conduction/non-conduction of the switching element of each light source module, and a control unit that controls the switching element drive unit such that the switching element of the same light source module is made to be conductive in response to the detection of light by a light detecting element that is arranged opposing the light emitting element of the light source module.

JP A-2016-105391 is an example of related art (Paragraphs 0007 and 0008, FIG. 1).

According to JP A-2016-105391, because a disconnection fault that occurs in a semiconductor light source light element in any of the light source modules is detected by the control unit via the light emitting element and the light detecting element, it takes time for the control unit to control the switching element drive unit to make the switching element of that light source module conductive, and the remaining light source modules turn off during that time. Accordingly, in a projection-type display apparatus that uses such a light source apparatus, periods occur in which images cannot be projected.

SUMMARY

A first advantage of some aspects of the invention is to provide a light source apparatus that, when an open fault occurs in any of a plurality of semiconductor light sources that are connected in series, can shorten the time period for which the other semiconductor light sources are turned off, and can even thereafter output a signal indicating that an open fault has occurred. Furthermore, a second advantage of some aspects of the invention is to provide a projection-type display device that uses such a light source apparatus.

In order to solve at least some of the problems described above, a light source apparatus according to a first aspect of the invention has a plurality of semiconductor light sources connected in series, a current detection resistor connected in series to the plurality of semiconductor light sources, a power source circuit that allows current to flow to the plurality of semiconductor light sources and the current detection resistor, a current detection circuit that detects the current that flows to the current detection resistor and outputs a current detection signal, a control circuit that controls the power source circuit such that a voltage of the current detection signal approaches a target value, a plurality of bypass circuits respectively connected in parallel to the plurality of semiconductor light sources, each of the bypass circuits including a clamp element that has a clamp voltage that is higher than a maximum voltage during operation of the semiconductor light source and a bypass resistor that is connected in series to the clamp element, and allowing current to flow when there is an open fault in the semiconductor light source, and a plurality of detection circuits that respectively detect an open fault in the plurality of semiconductor light sources based on an end-to-end voltage of the bypass resistors of the plurality of bypass circuits.

According to the first aspect of the invention, when an open fault occurs in any of the plurality of semiconductor light sources that are connected in series, the drive voltage that is supplied from the power source circuit increases, thus making it possible to shorten the time for which the other semiconductor light sources are turned off because the bypass current flows due to a clamp operation of the clamp element in the bypass circuit that is connected in parallel to the semiconductor light source with the open fault. Also, the detection circuit detecting an open fault in the semiconductor light source based on the end-to-end voltage of the bypass resistors makes it possible to even thereafter output a signal indicating that an open fault has occurred.

Here, it is desirable that a sum total of the clamp voltages of the clamp elements of the plurality of bypass circuits is smaller than the withstand voltage of the power source circuit. Thus, the power source circuit can be protected from a fault even if an open fault occurs in all of the plurality of semiconductor light sources.

Also, in each of the plurality of bypass circuits, it is desirable that the bypass resistor is connected closer to the ground potential side than the clamp element is. In this case, a configuration is possible in which each of the plurality of detection circuits operates with the potential of the ground potential side as a reference, making it possible to stabilize the detection operation even if the end-to-end voltage of the semiconductor light source varies.

Furthermore, the clamp element may include a Zener diode that has a cathode that is connected to an end of the semiconductor light source and an anode that is connected to another end of the semiconductor light source via the bypass resistor. Because current is quickly allowed to flow if the voltage that is applied between the cathode and the anode of the Zener diode reaches the breakdown voltage, it is possible to immediately allow current to flow to the other semiconductor light sources when an open fault occurs in any of the semiconductor light sources and the drive voltage that is supplied from the power source circuit rises.

In the above, the bypass resistor desirably has a resistance value that is smaller than a resistance value of the current detection resistor. Whereas the current detection resistor needs to have a certain resistance value in order to accurately detect the current that flows to the plurality of semiconductor light sources, the bypass resistor only needs to be able to detect whether or not current is flowing to the bypass circuit, thus heat generation can be reduced by lowering the resistance value.

Also, the light source apparatus may further have a plurality of level shifters that respectively shift a level of the detection signals that are output from the plurality of the detection circuits, and the control circuit may output information relating to an open fault in the plurality of semiconductor light sources based on the detection signals that are output from the plurality of level shifters. Thus, if an open fault occurs in any of the plurality of semiconductor light sources, it is possible to notify an external microcomputer or the like about the open fault.

A projection-type display apparatus according to a second aspect of the invention has any of the light source apparatuses described above. According to the second aspect of the invention, the reliability of the projection-type display apparatus can be improved with the use of a light source apparatus that, when an open fault occurs in any of a plurality of semiconductor light sources that are connected in series, can shorten the time period for which other semiconductor light sources are turned off, and can even thereafter output a signal indicating that an open fault has occurred.

DESCRIPTION OF EXEMPLARY EMBODIMENTS

Figure 1:
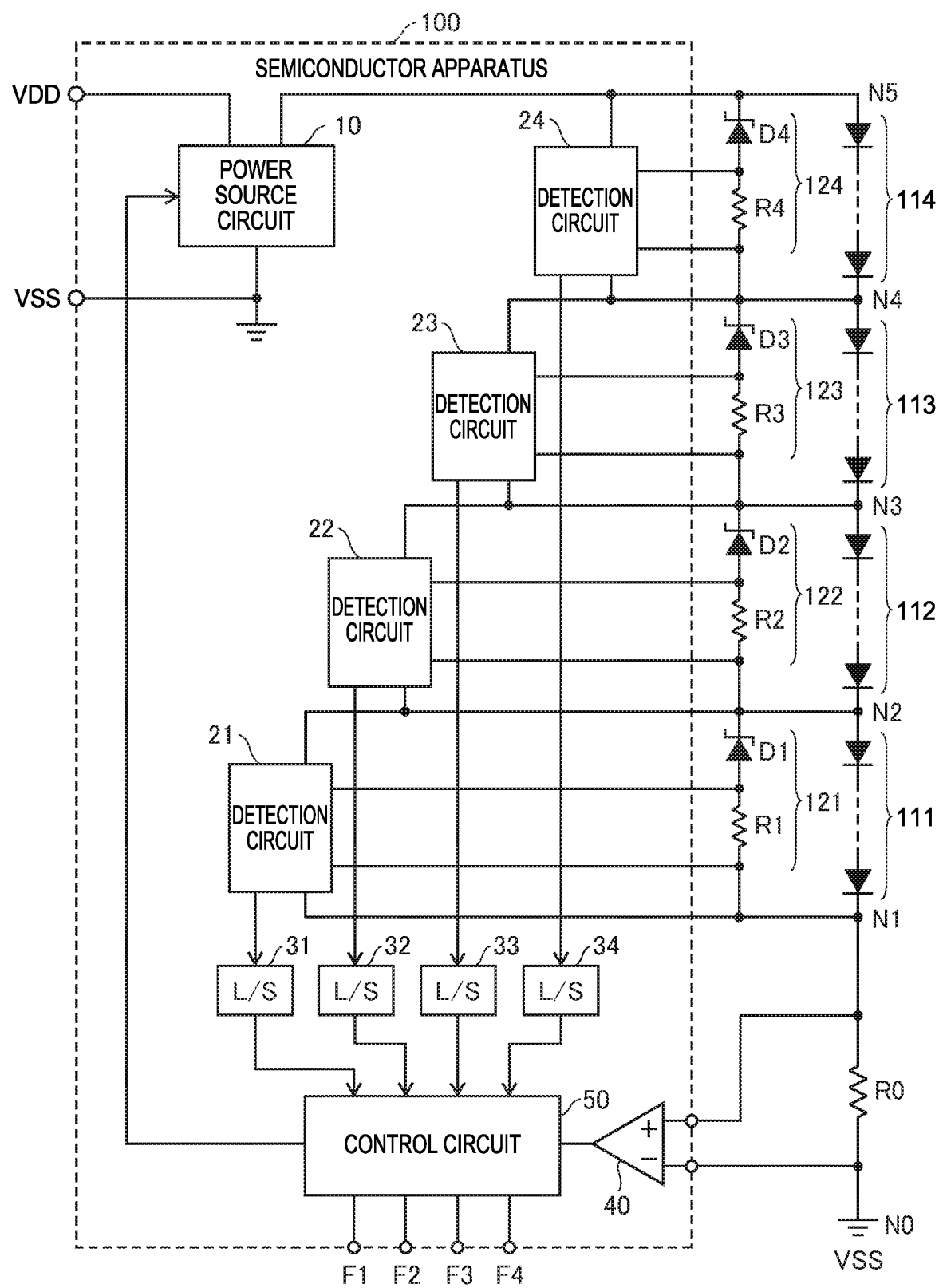
FIG. 1 is a circuit diagram showing an example of a configuration of a light source apparatus according to an embodiment of the invention.

The following is a detailed description of an embodiment of the invention with reference to the drawings. Note that the same constituent elements are denoted with the same reference numerals and redundant description is omitted.

Light Source Apparatus

FIG. 1 is a circuit diagram showing an example of a configuration of the light source apparatus according to an embodiment of the invention. As shown in FIG. 1, this light source apparatus includes a semiconductor apparatus (IC) 100, a plurality of semiconductor light sources 111, 112, . . . that are connected in series, a current detection resistor R0 that is connected in series to the plurality of semiconductor light sources 111, 112, . . . , and a plurality of bypass circuits 121, 122, . . . that are respectively connected in parallel to the plurality of semiconductor light sources 111, 112, . . . .

The following describes, as an example, a case in which four semiconductor light sources 111 to 114 are connected between nodes N1 to N5. Each of the semiconductor light sources 111 to 114 include at least one of a laser diode (LD) or a light emitting diode (LED), and emits light at a brightness that corresponds to the size of the supplied current.

For example, if each of the semiconductor light sources 111 to 114 is configured by eight LDs and the forward voltage of each LD is 4 V, the maximum voltage during operation of each of the semiconductor light sources 111 to 114 will be 32V. The current detection resistor R0 is connected in series to the semiconductor light sources 111 to 114 and, for example, has a low resistance value of about 50 mΩ to 100 mΩ.

Each of the bypass circuits 121 to 124 includes a clamp element that has a clamp voltage that is higher than the maximum voltage during operation of the semiconductor light sources that are connected in parallel, and a bypass resistor that is connected in series to the clamp element, and the bypass circuits allow current to flow when there is an open fault in a semiconductor light source. Note that an "open fault" in the present application is not limited to a disconnection of a semiconductor light source or the wiring thereof, and is a broad concept that includes a state in which a path of electric current is cut off due to improper installation of a semiconductor light source or the like.

FIG. 1 shows Zener diodes D1 to D4 as the clamp elements and bypass resistors R1 to R4 that are respectively included in the bypass circuits 121 to 124. For example, the Zener diode D1 has a cathode that is connected to one end (the upper end in the diagram) of the semiconductor light source 111 and an anode that is connected to the other end (the lower end in the diagram) of the semiconductor light source 111 via the bypass resistor R1.

Because current is quickly allowed to flow if the voltage that is applied between the cathode and the anode of the Zener diode reaches the breakdown voltage, when an open fault occurs in any of the semiconductor light sources and the drive voltage that is supplied from a power source circuit 10 rises, it is possible to immediately allow current to flow to the other semiconductor light sources.

The lower limit of the breakdown voltage of each of the Zener diodes D1 to D4 is set to a value that is obtained by adding a margin voltage to a voltage that corresponds to the current value that flows at the time of operation of the corresponding semiconductor light source with consideration for variation of the current values and the semiconductor light sources. In order to prevent a malfunction due to ripples and the like, it is preferable that the breakdown voltage of the Zener diodes D1 to D4 is set at least 30% higher than the maximum voltage during the operation of the semiconductor light sources.

For example, if the maximum voltage during the operation of the semiconductor light sources is 32 V (eight LDs connected in series), then the breakdown voltage of the Zener diodes D1 to D4 is set to 42 V or more. Also, if the maximum voltage during the operation of the semiconductor light sources is 40 V (ten LDs connected in series), then the breakdown voltage of the Zener diodes D1 to D4 is set to 52 V or more.

On the other hand, there is a need to set the upper limit of the breakdown voltage of each of the Zener diodes D1 to D4 such that the current that flows to the Zener diodes of the bypass circuits that are connected in parallel to the semiconductor light sources is within the rated current when an open fault occurs in a semiconductor light source. Note that resistors for adjustment may be respectively connected in series to the Zener diodes D1 to D4.

Each of the bypass resistors R1 to R4 may have a resistance value of around 50 mΩ to 100 mΩ, similarly to the current detection resistor R0, but it is desirable that each of the bypass resistors R1 to R4 has a resistance value that is smaller than that of the current detection resistor R0. Whereas the current detection resistor R0 needs to have a certain resistance value in order to accurately detect the current that flows to the semiconductor light sources 111 to 114, the bypass resistors R1 to R4 only need to be able to detect whether or not current is flowing to the bypass circuits 121 to 124, and thus heat generation can be reduced by lowering the resistance value.

Semiconductor Apparatus

The semiconductor apparatus 100 includes the power source circuit 10, a plurality of detection circuits 21 to 24 that are provided in correspondence with the plurality of semiconductor light sources 111 to 114, a plurality of level shifters (L/S) 31 to 34, a current sense amplifier 40, and a control circuit 50. Note that at least some of the constituent elements of the semiconductor apparatus 100 shown in FIG. 1 may be discrete components or external ICs.

The power source circuit 10 is supplied with power source potentials VDD and VSS from outside of the semiconductor apparatus 100, and allows current to flow to the plurality of semiconductor light sources 111 to 114 and the current detection resistor R0 by supplying a drive potential or a drive current to a node N5. In the present embodiment, the power source potential VSS is a ground potential (0V), and the power source circuit 10 supplies the drive voltage between the node N5 and a node 0 of the ground potential VSS.

Here, the sum total of the clamp voltages of the clamp elements of the plurality of bypass circuits 121 to 124, that is, the sum total of the breakdown voltages of the Zener diodes D1 to D4, is desirably smaller than the withstand voltage of the power source circuit 10. Thus, even if an open fault occurs in all of the plurality of semiconductor light sources 111 to 114, the power source circuit 10 can be protected from breaking.

The current sense amplifier 40 is a current detection circuit that detects the current that flows to the current detection resistor R0 and outputs a current detection signal by amplifying the end-to-end voltage of the current detection resistor R0 by a predetermined amplification ratio. The control circuit 50, for example, controls the power source circuit 10 such that the voltage of the current detection signal (an average voltage or a voltage in a predetermined period) approaches a target value through digital dimming or analog dimming. The target value may be a fixed value, or may be set by an external microcomputer or the like.

Because the plurality of semiconductor light sources 111 to 114 are connected in series, if there is an open fault in one of the semiconductor light sources, current will not flow to the other semiconductor light sources. Therefore, a plurality of detection circuits 21 to 24 that respectively detect an open fault of the plurality of semiconductor light sources 111 to 114 based on the end-to-end voltage of the bypass resistors R1 to R4 of the plurality of bypass circuits 121 to 124 are provided.

Figure 2:
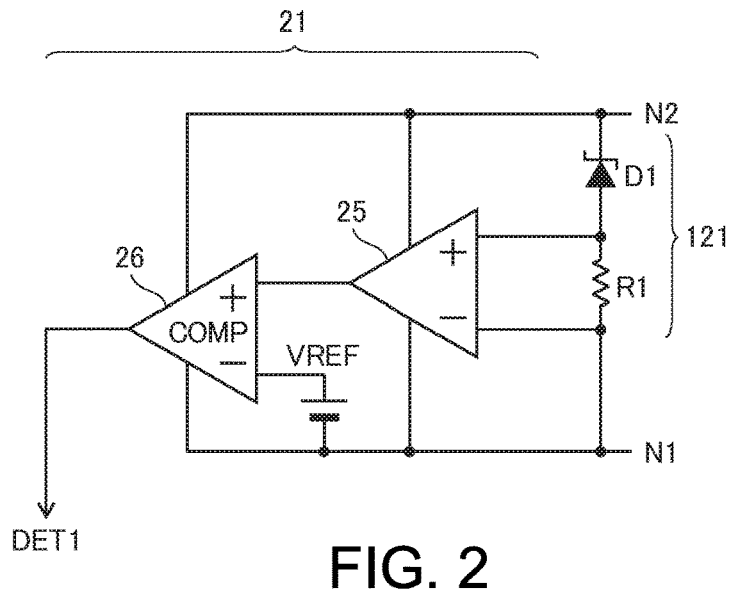
FIG. 2 is a circuit diagram showing an example of a configuration of a detection circuit shown in FIG. 1.

FIG. 2 is a circuit diagram showing an example of a configuration of the detection circuit shown in FIG. 1. FIG. 2 shows an example of a configuration of the detection circuit 21, and the configuration of the detection circuits 22 to 24 may be similar. As shown in FIG. 2, the detection circuit 21 includes a current sense amplifier 25 and a comparator 26, and detects open faults in the semiconductor light source 111 (FIG. 1) based on the end-to-end voltage of the bypass resistor R1 of the bypass circuit 121. The power source voltage of the detection circuit 21 can be supplied from a first node N1 and a second node N2.

The current sense amplifier 25 is constituted by, for example, a differential amplifier, a single amplifier, or the like, and amplifies the end-to-end voltage of the bypass resistor R1 by a predetermined amplification ratio to generate an output voltage. The comparator 26 compares the output voltage of the current sense amplifier 25 to a reference voltage VREF. The reference voltage VREF may be generated by a fixed voltage circuit or a voltage dividing circuit that is connected between the first node N1 and the second node N2.

Alternatively, if the comparator 26 has an offset, the input conversion voltage of the offset may be used as the reference voltage VREF. In a case where the comparator that has an offset is used in the plurality of detection circuits 21 to 24 (FIG. 1), even if the power source potential supplied to the comparator is different, a uniform reference voltage can easily be generated.

The comparator 26 deactivates a detection signal DET1 to low level when the output voltage of the current sense amplifier 25 is smaller than reference voltage VREF, and activates the detection signal DET1 to high level when the output voltage of the current sense amplifier 25 is larger than the reference voltage VREF.

Referring again to FIG. 1, in each of the plurality of bypass circuits 121 to 124, it is desirable that the bypass resistors R1 and R4 are connected closer to the ground potential VSS side than the Zener diodes D1 to D4 that are clamp elements are. In this case, a configuration is possible in which each of the plurality of detection circuits 21 to 24 operates with the potential of the ground potential VSS side as a reference, making it is possible to stabilize the detection operation even if the end-to-end voltage of the semiconductor light sources 111 to 114 varies.

For example, if an open fault occurs in the semiconductor light source 111, the voltage of the current detection signal that is output from the current sense amplifier 40 decreases because the current that flows to the current detection resistor R0 decreases. Accordingly, the control circuit 50 controls the power source circuit 10 so as to increase the drive voltage that is supplied to the semiconductor light sources 111 to 114.

By increasing the drive voltage supplied from the power source circuit 10, in the bypass circuit 121 that is connected in parallel to the semiconductor light source 111, the voltage between the cathode and the anode of the Zener diode D1 reaches the breakdown voltage and the bypass current flows to the Zener diode D1 and the bypass resistor R1. Thus, it is possible to shorten the time period for which the other semiconductor light sources 112 to 114 are turned off because current also flows to those other semiconductor light sources 112 to 114.

The end-to-end voltage of the bypass circuit 121 is maintained at the sum of the breakdown voltage of the Zener diode D1 and the end-to-end voltage of the bypass resistor R1. In this case, the power consumption (generated heat) of the light source apparatus increases in comparison to a case in which a short circuit caused by the switching element occurs between both ends of the semiconductor light source 111 with the open fault, but this is tolerable because it is a temporary measure that lasts until the semiconductor light source 111 with the open fault is replaced with a new semiconductor light source.

On the other hand, because the power source voltage is supplied from the node N1 and the node N2 to the detection circuit 21 due to a short circuit not occurring between both ends of the semiconductor light source 111 with the open fault, the detection circuit 21 continues to operate and it is possible to detect the open fault of the semiconductor light source 111 based on the end-to-end voltage of the bypass resistor R1. The detection circuit 21 detects an open fault in the semiconductor light source 111 and activates a detection signal when the end-to-end voltage of the bypass resistor R1 exceeds a predetermined value.

The plurality of level shifters 31 to 34 respectively shift the level of the detection signals that are output from the plurality of detection circuits 21 to 24. Also, the control circuit 50 outputs information relating to open faults of the plurality of semiconductor light sources 111 to 114 based on the detection signals that are output from the plurality of level shifters 31 to 34.

Thus, when an open fault occurs in any of the plurality of semiconductor light sources 111 to 114, it is possible to notify an external microcomputer or the like about the open fault. For example, the control circuit 50 may generate open fault flags F1 to F4 based on the detection signals that are output from the plurality of level shifters 31 to 34, and output the open fault flags F1 to F4 from four terminals of the semiconductor apparatus 100.

Alternatively, if the plurality of semiconductor light sources 111 to 114 are formed as one unit, the control circuit 50 may generate an open fault flag F0 indicating that the detection signal that is output from one of the plurality of the level shifters 31 to 34 has been activated, and output the open fault flag F0 from one terminal of the semiconductor apparatus 100.

As described above, according to the present embodiment, when an open fault occurs in any of the plurality of semiconductor light sources that are connected in series, the drive voltage that is supplied from the power source circuit increases, thus making it possible to shorten the time period for which the other semiconductor light sources are turned off because the bypass current flows due to a clamp operation of the clamp element in the bypass circuit that is connected in parallel to the semiconductor light source with the open fault. Also, the detection circuit detecting an open fault in the semiconductor light source based on the end-to-end voltage of the semiconductor light source makes it possible to output a signal indicating that an open fault has occurred even after current flows via the bypass circuit.

Projection-Type Display Apparatus

The following describes the projection-type display apparatus (video projector) according to one embodiment of the invention.

Figure 3:
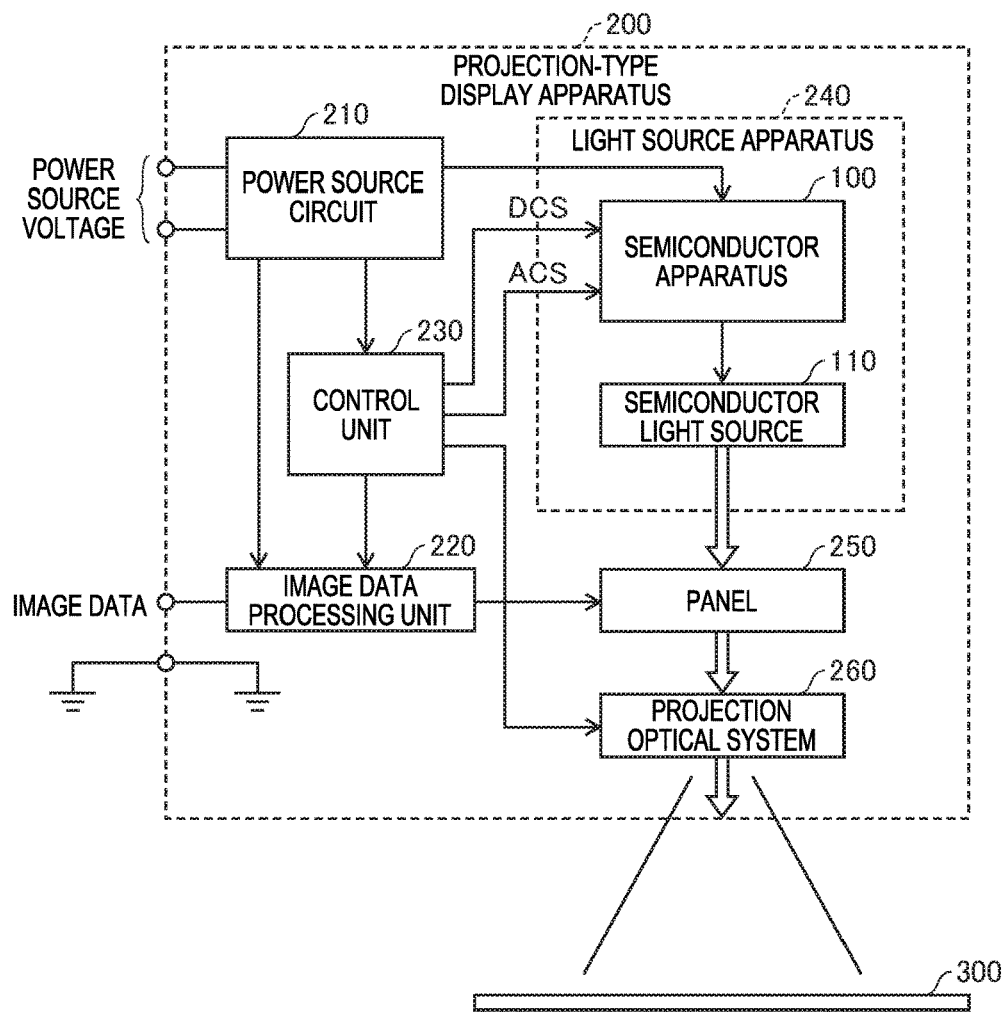
FIG. 3 is a block diagram showing an example of a configuration of a projection-type display apparatus according to an embodiment of the invention.

FIG. 3 is a block diagram showing an example of a configuration of the projection-type display apparatus according to one embodiment of the invention. A projection-type display apparatus 200 is supplied a power source voltage from outside, and is supplied image data from an image data supply apparatus such as a personal computer or a video player and projects an image onto a screen (projection surface) 300 based on the image data.

As shown in FIG. 3, the projection-type display apparatus 200 includes a power source circuit 210, an image data processing unit 220, a control unit 230, a light source apparatus 240, a panel 250 and a projection optical system 260. Here, the light source apparatus 240 is the light source apparatus according to one embodiment of the invention, and includes the semiconductor apparatus 100 and a plurality of semiconductor light sources 110 that are connected in series.

The power source circuit 210, for example, based on a power source voltage of AC 100 V that is supplied from outside, generates a DC logic power source voltage and supplies the DC logic power source voltage to the image data processing unit 220, the control unit 230, and the like, and also generates a DC power source voltage that is higher than the logic power source voltage and supplies the higher DC power source voltage to the semiconductor apparatus 100 of the light source apparatus 240, and the like.

The image data processing unit 220 and the control unit 230 are constituted by, for example, at least one microcomputer and the like. The image data processing unit 220 processes image data supplied from outside to generate an image signal for display and a synchronizing signal, and drives the panel 250 and renders the image data by supplying the image signal and the synchronizing signal to the panel 250.

The control unit 230 controls the components of the projection-type display apparatus 200 in accordance with the operation of a user that is made with use of a remote control or a control panel (not shown). If it is possible to adjust the light of the light source apparatus 240, the control unit 230 generates a digital dimming signal DCS or an analog dimming signal ACS, and supplies either the digital dimming signal DCS or the analog dimming signal ACS to the semiconductor apparatus 100 of the light source apparatus 240. Thus, the semiconductor apparatus 100 controls the light emission operation of the plurality of semiconductor light sources 110 that are connected in series.

The light source apparatus 240 irradiates light at a brightness that is in accordance with the digital dimming signal DCS or the analog dimming signal ACS that is supplied from the control unit 230 and projects the light onto the panel 250. For example, if the semiconductor light source 110 includes a plurality of laser diodes that generate blue light, the light source apparatus 240 may further include phosphors that receive blue light that is generated by some of the laser diodes and generate yellow light, and a spectroscopic unit that separates red light and green light from the yellow light in accordance with the wavelength. In this case, the light source apparatus 240 can generate light in three colors, namely R (red), G (green) and B (blue).

The panel 250 modulates light that is irradiated from the light source apparatus 240, in accordance with the image signal and synchronizing signal that are supplied from the image data processing unit 220. For example, the panel 250 may include three liquid crystal panels corresponding to the three colors RGB. Each liquid crystal panel forms an image by changing the transmittance of light in a plurality of pixels that are arranged in a matrix. The modulated light that is modulated by the panel 250 is guided to the projection optical system 260.

The projection optical system 260 includes at least one lens. For example, the projection optical system 260 is provided with a projection lens that is a group of lenses for projecting modulated light that is modulated by the panel 250 onto the screen 300 to form an image, and is provided with a variety of adjustment mechanisms that adjust the aperture, zoom, shift position, and the like of the projection lenses. These adjustment mechanisms are controlled by the control unit 230. An image is displayed on the screen 300 by the projection optical system 260 projecting the modulated light onto the screen 300.

According to the present embodiment, the reliability of the projection-type display apparatus 200 can be improved with the use of a light source apparatus 240 that, when an open fault occurs in any of the plurality of semiconductor light sources 110 that are connected in series, can shorten the time period for which the other semiconductor light sources are turned off, and can even thereafter output a signal indicating that an open fault has occurred.

The invention is not limited to the embodiments described above, and can be modified without departing from the technical concept of the invention by those with ordinary skill in the art.

This application claims priority from Japanese Patent Application No. 2018-009439 filed in the Japanese Patent Office on Jan. 24, 2018, the entire disclosure of which is hereby incorporated by reference in its entirely.

What is claimed is:

1. A light source apparatus comprising:
a plurality of semiconductor light sources connected in series;
a current detection resistor connected in series to the plurality of semiconductor light sources;
a power source circuit that allows current to flow to the plurality of semiconductor light sources and the current detection resistor;
a current detection circuit that detects current that flows to the current detection resistor and outputs a current detection signal;
a control circuit that controls the power source circuit such that a voltage of the current detection signal approaches a target value;
a plurality of bypass circuits respectively connected in parallel to the plurality of semiconductor light sources, each of the bypass circuits including a clamp element that has a clamp voltage that is higher than a maximum voltage during operation of the semiconductor light source and a bypass resistor that is connected in series to the clamp element, and allowing current to flow when there is an open fault in the semiconductor light source;
a plurality of detection circuits that respectively detect an open fault in the plurality of semiconductor light sources based on an end-to-end voltage of the bypass resistors of the plurality of bypass circuits; and
a plurality of level shifters that respectively shift a level of detection signals that are output from the plurality of detection circuits,
wherein the control circuit outputs information relating to an open fault in the plurality of semiconductor light sources based on the detection signals that are output from the plurality of level shifters.

2. The light source apparatus according to claim 1, wherein a sum total of the clamp voltages of the clamp elements of the plurality of bypass circuits is smaller than a withstand voltage of the power source circuit.

3. The light source apparatus according to claim 1, wherein, in each of the plurality of bypass circuits, the bypass resistor is connected closer to a ground potential side that the clamp element is.

4. The light source apparatus according to claim 1, wherein the clamp element includes a Zener diode that has a cathode that is connected to an end of the semiconductor light source and an anode that is connected to another end of the semiconductor light source via the bypass resistor.

5. The light source apparatus according to claim 1, wherein the bypass resistor has a resistance value that is smaller than a resistance value of the current detection resistor.

6. A projection-type display apparatus comprising the light source apparatus according to claim 1.

7. A light source apparatus comprising:
a first semiconductor light source that has one end and another end;
a second semiconductor light source that has one end and another end, with the one end being coupled to the other end of the first semiconductor light source;
a current detection resistor that has one end and another end, with the one end being coupled to the other end of the second semiconductor light source;
a power source circuit that apply current to the first semiconductor light source, the second semiconductor light source, and the current detection circuit;
a current detection circuit that detects current that flows to the current detection resistor and outputs a current detection signal;
a control circuit that controls the power source circuit based on the current detection signal;
a first bypass circuit coupled in parallel to the first semiconductor light source, the first bypass circuit including a first clamp element that has a first clamp voltage that is higher than a maximum voltage during operation of the first semiconductor light source and a first bypass resistor that is coupled in series to the first clamp element, and applying current when there is an open fault in the first semiconductor light source;
a second bypass circuit coupled in parallel to the second semiconductor light source, the second bypass circuit including a second clamp element that has a second clamp voltage that is higher than a maximum voltage during operation of the second semiconductor light source and a second bypass resistor that is coupled in series to the second clamp element, and applying current when there is an open fault in the second semiconductor light source;
a first detection circuit that detects an open fault of the first semiconductor light source based on an end-to-end voltage of the first bypass resistor;
a second detection circuit that detects an open fault of the second semiconductor light source based on an end-to-end voltage of the second bypass resistor; and
a first level shifter and a second level shifter that respectively shift a level of detection signals that are output from the first detection circuit and the second detection circuit,
wherein the control circuit outputs information relating to an open fault in the first semiconductor light source and the second semiconductor light source based on the detection signals that are output from the first level shifter and the second level shifter, respectively.

* * * * *